May 28, 1963

A. M. THOMPSON 3,091,135

INDEXING MECHANISM

Filed Dec. 7, 1961

INVENTOR
ARNOLD M. THOMPSON

May 28, 1963  A. M. THOMPSON  3,091,135
INDEXING MECHANISM
Filed Dec. 7, 1961  2 Sheets-Sheet 2
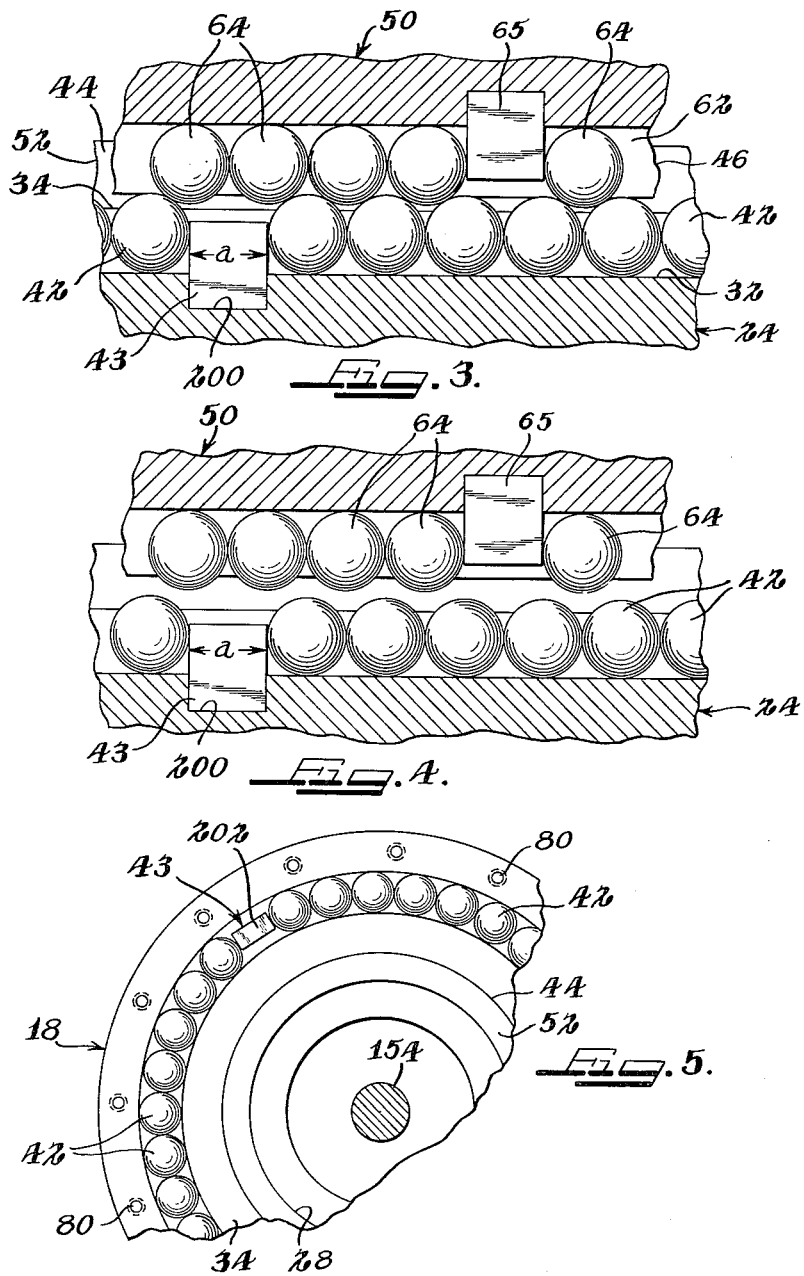
INVENTOR
ARNOLD M. THOMPSON

United States Patent Office 3,091,135
Patented May 28, 1963

3,091,135
INDEXING MECHANISM
Arnold M. Thompson, Wheaton, Ill., assignor to Thompson Designs, Inc., Franklin Park, Ill., a corporation of Illinois
Filed Dec. 7, 1961, Ser. No. 157,753
8 Claims. (Cl. 74—826)

The present invention relates to indexing mechanisms and has particular reference to indexing mechanisms of the type shown and described in a copending United States patent application of John G. Hoeger, Serial No. 54,615, filed on September 8, 1960 and entitled "Indexing Mechanism," and over which mechanism the present one is an improvement.

Briefly, an indexing mechanism of the type shown and described in the above-mentioned application is capable of supporting a workpiece and of changing the angular position thereof so that various metal working operations may be performed thereon at angularly spaced regions on the workpiece. Such indexing fixtures are widely used in the metal working field and are known as indexing plates or tables, including as they do, a rotary plate or table mounted in turret fashion on a stationary base. The angular position of the plate may be varied either by the use of a circular scale and pointer device, or by an indexing mechanism by means of which the plate or table may be released, rotated on its bearing relatively to the base, and thereafter, locked or secured in the desired angular position. The degree of accuracy afforded by an indexing mechanism or fixture of this type is, generally speaking, commensurate with the cost of the fixture, and in instances where a high degree of accuracy is required, the complexity of the fixture is such as to make the cost prohibitive.

The specific indexing mechanism of the above-mentioned patent application was designed to afford a high degree of accuracy in indexing the plate or table and at an extremely low cost as compared to prior mechanisms of the same general type, and toward this end, the mechanism depended for its efficiency and low cost upon the accurate placement of two series or circular rows of circumferentially arranged, spherical, hardened, steel balls, with the balls of each row making tangential contact under slight pressure, each with an adjacent ball on each side thereof. The extremely small tolerances which exist in connection with the manufacture of commercial ball bearings and the uniformity of elasticity thereof render such bearing balls entirely satisfactory for use, and when so used, the fundamental concept of operation is based upon the consideration that any irregularities which may exist in the construction of the individual balls and which to begin with are extremely small due to the fine tolerances associated with ball bearing manufacture, are divided over the entire linear circular extent of the series of balls and are thus reduced practically to nothingness in the over-all pattern of mating graduations.

It has been found that, in connection with the indexing mechanism of the above-mentioned patent application, at least one serious limitation is attendant upon the construction and use of the mechanism, this limitation being predicated upon the inability to maintain the balls of the two circular row of balls fixedly anchored in the plate or table and in the base against circumferential shifting. Because of the fact that all of the balls in each row are firmly compressed in the circular row with each ball making tangential point contact with two adjacent balls, there is no possibility of individual circumferential shifting of any one ball in the row so that the magnitude of the indexing graduations of which the mechanism is capable does not vary and remains equal at all times. However, despite the fact that the balls of each circular row of balls, as a whole, are clamped in position on the plate or base, as the case may be, under an appreciable degree of pressure and are firmly compressed against one another so that they effectively present a solid metal column or closed ring of metal around the circular row, it has been found that, under certain conditions of use of the mechanism, there is a tendency for the entire circular row of balls to shift circumferentially in one direction or the other bodily, thus destroying the accuracy of the mechanism and rendering the same unfit for further use. Obviously, in a mechanism where extreme accuracy is required, the slightest degree of circumferential shifting of either circular row of balls cannot be tolerated.

Such circumferential shifting bodily of either circular row of balls is not necessarily a result of rough handling or usage of the mechanism. It takes place incident to descent of the upper plate upon the lower base in the normal course of use of the mechanism. It may take place under normal manual pressure when the mechanism is designed for manually-controlled indexing operations. It is more apt to take place when the mechanism is designed for automatic or semi-automatic operations, as, for example, when the movements of the upper plate or table are pneumatically or hydraulically controlled. The off-center impact of the balls in the upper circular row of balls, with the balls in the lower circular row of balls on either side of a dead center will, by a camming action, apply oppositely directed circumferential thrusts to both rows of balls and whichever series of balls is less securely anchored in position will shift accordingly. At no time is this circumferential thrust the result of any one pair of contacting off-center balls. Invariably due to the equal spacing of the balls and to their equality in number in the two rows respectively, the circumferential thrust which is applied to either row of balls, or to both rows thereof, is the cumulative thrust of all of the contacting pairs of balls circumferentially around the series.

The present invention is designed to overcome the above-noted limitation that is attendant upon the construction and use of indexing mechanisms or fixtures of the type shown and described in the above-mentioned copending patent application and, accordingly, there is contemplated the provisions of a novel means for securely anchoring the balls of each circular row, i.e., in the movable plate or table, and in the fixed immovable base respectively, against circumferential shifting in either direction regardless of the rough usage to which the mechanism may be put, or of the degree of clamping pressure which may be brought to bear by power-initiated means upon the fixed and movable members of the indexing mechanism.

The provision of a novel means for preventing circumferential shifting of either circular row of balls, in an indexing mechanism or fixture of the character under consideration as briefly outlined above, being the principal object of the invention, it is contemplated that in carrying out this object, one of the balls in each series be dispensed with and in its stead there be substituted a reaction post which functions in the series in the manner of the ball which it replaces to preserve the solid continuity of metal around the circular row so that the individual balls will, as heretofore mentioned, remain securely wedged together under high compressional forces. Under such circumstances, there can be no relative shifting of the balls with respect to one another. The reaction post also preserves the unit spacing between adjacent balls, and because it is securely anchored in position in the member with which it is associated, namely, the upper plate or the lower base, it serves to assimilate any circumferential thrust that may be applied to the circular row of balls as a whole and thus prevents circumferential shifting thereof.

It is a further object of the invention, in an indexing mechanism of this character, to provide a reaction post for preventing circumferential shifting of the circular series of balls with which it is associated and which is so designed according to geometrical considerations that despite its variance from spherical form, it will exert the same spacing effect upon the adjacent balls in the series which straddle it as the ball which it replaces, thus maintaining all of the balls in the series with which it is associated in their proper circumferentially disposed relationship.

With these and other objects in view, which will become more readily apparent as the following description ensues, the invention consists of the novel construction, combination, and arrangement of parts shown in the accompanying two sheets of drawings forming a part of this specification.

In these drawings:

FIG. 3 is an enlarged fragmentary sectional view taken substantially along the line 3—3 of FIG. 2 but with the rotatable indexing table circumferentially displaced to bring certain elements of the invention into view;

FIG. 4 is a sectional view similar to FIG. 3 but showing the parts engaged; and

FIG. 5 is a fragmentary plan view of a base plate assembly employed in connection with the present invention and embodying the principles thereof.

Figure 1:
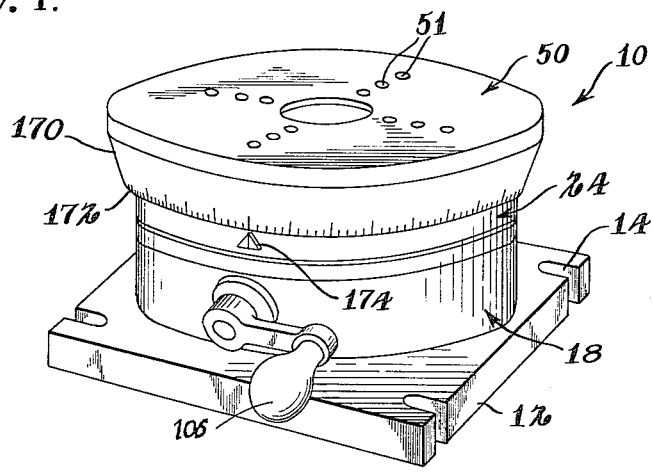
FIG. 1 is a perspective view of an indexing mechanism or fixture embodying the principles of the present invention.
Figure 2:
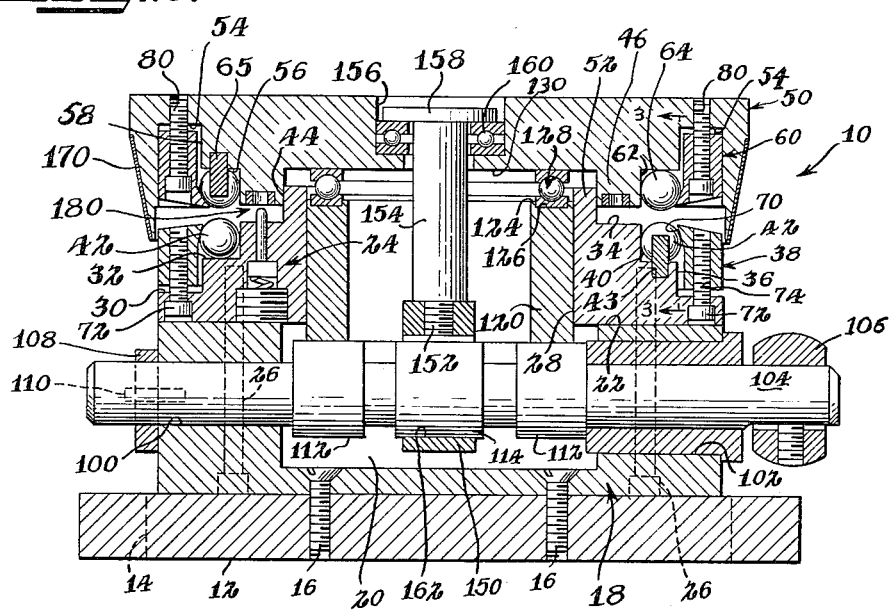
FIG. 2 is an enlarged sectional view taken substantially centrally and vertically through the mechanism of FIG. 1 but showing the principal parts of the mechanism in their disengaged position.

Referring now to the drawings in detail, and in particular to FIGS. 1 and 2, an indexing mechanism in the form of a fixture embodying the principles of the present invention has been designated in its entirety by the reference numeral 10. The fixture 10 is of the same general type shown and described in the above-mentioned copending application Serial No. 54,615, and it also is similar in its design, construction and function to the fixture of such application. The fixture 10 involves in its general organization a base block 12 of generally rectangular configuration and having marginally disposed notches 14 formed therein and by means of which it may readily be mounted on a worktable or other working surface of a machine tool or the like. Fixedly secured to the upper face of the base block 12 by means of anchoring screws 16 or the like is a base casting 18 which is preferably of cylindrical design and embodies a central circular socket or well 20 in the upper face thereof. The base casting 18 thsu provides an upper flat annular face 22.

A stationary lower supporting member 24 is secured to the annular upper face of the base casting 18, such member hereinafter for convenience being referred to as the base plate. Suitable anchoring screws 26 are provided for the purpose of securing the base plate position on the base casting. The base plate 24 is in the form of an annular ring which has a vertical central cylindrical bore 28 therethrough. It further is provided with a stepped outer surface configuration. The stepped surface configuration of the base plate provides a lower upwardly facing annular land surface 30, an intermediate upwardly facing annular land surface 32, and an upper upwardly facing annular land surface 34.

The lower land surface 30 extends outwardly from an adjacent cylindrical wall surface 36, the two surfaces forming between them an annular recess which receives therein the lower regions of a clamping ring 38, the nature and function of which will be made clear presently. The intermediate land surface 32 extends outwardly from an adjacent cylindrical wall surface 40, and these latter two surfaces form therebetween an intermediate annular recess for reception therein of a series of lower locating balls 42, the nature and function of which likewise will be explained subsequently. The upper land surface 34 extends outwardly from an adjacent cylindrical surface 44 and these two last mentioned surfaces provide an annular recess for reception of a downwardly projecting circular boss 46 which is formed on the lower face of a generally circular indexing plate 50. The indexing plate 50 is positioned above the base plate 24, is coaxial therewith, and is mounted for rotation relatively thereto in either direction. Threaded holes 51 may be provided in the upper face of the indexing plate 50 to facilitate clamping of a workpiece to the plate. However, other work clamping means, such as a magnetic chuck device or the like, may be employed if desired.

The upper indexing plate 50 is maintained in axial alignment with the lower base plate 24 by means of an upwardly projecting piloting rim 52 which extends above the upper land surface 34 and projects into the circular boss 46 with a close frictional fit. The indexing plate 50 is capable of limited vertical axial movement toward and away from the lower base plate 24 for purposes that will become clear presently.

The underneath side of the upper indexing plate 50 is of stepped configuration, thus providing two downwardly facing land surfaces 54 and 56, respectively. The land surface 54 extends outwardly from an adjacent cylindrical surface 58, the two surfaces together defining an annular recess which receives therein the upper regions of an annular clamping ring 60 similar to the clamping ring 38. The land surface 56 extends outwardly from an adjacent cylindrical surface 62, the two surfaces 56 and 62 defining an annular recess for reception therein of a series of upper locating balls 64 similar to the series of balls 42.

The disposition and number of the circumferentially arranged series of balls 42 within the annular recess afforded by the two surfaces 32 and 40 is precisely the same as the disposition of the circumferentially arranged series of balls 64 within the annular recess afforded by the surfaces 56 and 62 and, therefore, a description of the nature of one series of balls will suffice for the other.

Each of the two circular rows of balls is continuous except for the substitution for one of the balls (which otherwise would complete the series and render the same uniform through the entire 360° extent) of a reaction post having a transverse dimension in a circumferential direction equal to the diameter of the balls. The reaction post for the lower series of balls 42 has been designated at 43, and the reaction post for the upper series of balls 64 has been designated at 65. These reaction posts 43 and 65 constitute an important feature of the present invention and are designed to prevent circumferential shifting of their respective series of balls, all in a manner that will be clear presently.

The two land surfaces 32 and 54 against which the various balls 42 and 64 respectively are seated are disposed in vertical opposition to each other so that the two series of balls which are disposed in their respective recesses in the base plate and indexing plate respectively are capable of mating register and contact with each other when the indexing plate which carries the upper series of balls 64 is moved to the lowered position in which it is fragmentarily illustrated in FIG. 4. When the indexing plate 50 is in the elevated position in which it is shown in FIGS. 2 and 3, the two series of balls 42 and 64 are separated to such an extent that they clear each other and the indexing plate 50 is free to turn in either direction under manual control. Since the number of balls in the upper series is equal to the number of balls in the lower series, and since all of the balls are uniform in diameter, as well as being equally spaced from the central vertical axis of the plates 24 and 50, seating of the upper plate assembly upon the lower plate assembly involves a positioning of the balls of the two series in tangential relationship with each individual ball of one series, except the two balls which adjoin the reaction post, engaging two adjacent balls of the other series, as clearly shown in FIG. 3. The two plates 24 and 50 may thus be brought into just as many positions with respect to each other as there are balls in each series.

The number of balls in each series of balls may vary widely from a lower limit of three balls to an upper limit which is determined only by the effective diameter of the plates 24 and 50 and by the use of balls sufficiently large that the graduations which they create between them are at least perceptible and effective for seating purposes. Irrespective, however, of the particular number of balls employed in each series or of the size thereof, the essential features of the invention are at all times preserved.

The balls 42 are disposed within the annular recess afforded by the surfaces 32 and 40 and are arranged in a circular row with adjacent balls being in tangential contact. The balls make substantial point contact with the flat annular surface 32 of the base plate 18 and are compressed inwardly against the cylindrical surface 40 by means of the clamping ring 38 which surrounds the balls and is formed with a generally frusto-conical clamping surface 70 on its inside face. The clamping ring 38 is adapted to be drawn downwardly toward the land surface 30 by means of a series of circumferentially spaced clamping screws 72 which project upwardly through the peripheral regions of the base plate 24 and extend into, and are received in, threaded bores 74 provided in the clamping ring 38. The surfaces 30 and 42, in combination with the frusto-conical clamping surface 70, thus define, in effect, an annular channel or trough within which the various balls 42 are effectively wedged in fixed relationship with respect to the base plate 24.

The balls 42 and 64 are preferably in the form of commercially available steel bearing balls such as are commonly used in connection with antifriction bearings. Such balls are possessed of an extremely high degree of accuracy as regards their spherical contour, and in the manufacture thereof, permissible tolerances are on the order of 0.000001 inch as regards their diameter in any direction. A steel bearing ball, regardless of the hardness thereof, is possessed of a very small degree of elasticity. A solid spherical body having any degree of elasticity whatsoever, even to the extreme degree possessed by a body of elastomeric material such as rubber, is not appreciably misshapen by the application of a moderate degree of compressional force thereto at diametrically opposed regions. If the compressing media presents planar contact faces, as, for example, the inside clamping surfaces of a vice, initial application of compressional forces to the spherical body from opposite sides thereof will merely create oppositely disposed small area flats on the surface of the sphere. The infinitesimal amount of displaced metal will scarcely disturb the molecular disposition of the remainder of the sphere and, except for the minute flats mentioned above, the outer surface of the sphere will remain truly spherical. Where tangentially arranged balls under compression are concerned, the flats existing between the balls at the regions of tangency are even smaller than they are in the case of planar pressure surfaces.

In the application of the balls to the base plate 24, the requisite number of balls are loosely positioned on the land surface 32 in their approximate positions of tangency and are confined on the surface 32 by means of the clamping ring 38 which loosely surrounds them. Assuming for purposes of discussion that the balls 42 are caused to align themselves on the annular surface 32 so as to form a precise circular row of tangentially arranged balls, excepting of course for the single reaction post 43 which has been substituted for one of the balls in the series, the selected number of balls and the selected diameter of the individual balls is such that there will be a slight clearance between each ball and the adjacent cylindrical surface 40. Such a clearance will be extremely small and may be measured in millionths of an inch. With the balls thus loosely positioned on the surface 32, the various clamping screws 72 are tightened so as to draw the frusto-conical clamping surface 70 against the balls to force the same radially inwardly against the cylindrical surface 40 and close the gap so that all of the balls in the circular row of balls make tangential, as well as point, contact with this surface. The inward pressure applied to the balls 42 by the frusto-conical clamping surface 70 causes the various tangentially-disposed balls to exert pressure upon one another in a circumferential direction, thus establishing relatively small microscopic flats on the various balls at the regions of tangency. The amount of tightening required of the various clamping screws 72 may be ascertained by the operator who will adjust his torque wrench to a pressure slightly in excess of that required to establish five points of tangency on each ball, one for each surface 32, 40 and 70, and two for the tangential contact which each ball makes with the adjacent balls on opposite sides thereof.

The procedure involved in assembling the various balls 42 on the lower base plate 24 may be followed for assembly of the balls 64 on the upper indexing plate 50 utilizing the clamping ring 60 and clamping screws 80 associated therewith for ball-clamping purposes, and thus, a detailed description of this procedure need not be repeated herein. It will be understood that the assembly may be accomplished on a work bench with the ball-seating land surface 56 facing upwardly. It is to be noted that the clamping screws 80 extend through the clamping ring 60 from the underneath side thereof so that they are not readily accessible in the assembled fixture, this expedient being resorted to in order to discourage unauthorized tampering with the adjustment by the operator.

Manual means are provided for shifting the indexing plate 50 vertically in opposite directions between a raised position wherein the upper series of balls 64 clear the lower series of balls to permit manual turning of the indexing plate in either direction of rotation for indexing purposes, and a lowered position wherein the upper series of balls seat tangentially on the lower series of balls with the plate being effectively locked in such lowered position. Accordingly, the lower region of the base casting 18 is formed with a radially extending bore 100 on one side thereof and this bore communicates with the central socket 20. A similar radially extending bore 102 is provided on the other side of the socket in diametrical alignment with the bore 100. Rotatably journalled in, and projecting completely through, the two aligned bores 100 and 102 is an operating shaft 104 having a manipulating handle 106 on one projecting end thereof and a limit collar 108 on the other projecting end thereof. The limit collar 108 is designed for cooperation with a stop pin 110 in restricting rotational movements of the shaft 104 to approximately 180° in either direction under the control of the handle 106.

The shaft 104 extends across the circular socket 20 and is provided with a pair of spaced apart eccentric cam lobes 112 and a medial eccentric cam lobe 114. The three lobes are eccentric in the same direction. The two lobes 112 function as plate-lifting lobes for raising the indexing plate 50 to its raised position, while the lobe 114 functions as a plate-locking lobe for securing the indexing plate in its lowered position in any selected position of indexing adjustment.

A cylindrical thrust ring 120 is slidably disposed within the central bore 28 of the base plate 24. The upper circular rim 124 of the thrust ring 120 is formed with an annular groove 126 therein within which there is disposed an antifriction bearing assembly 128. The bearing assembly 128 is interposed between the upper rim 124 of the ring 120 and the underneath face 130 of the indexing plate 50. When the manipulating handle 106 is turned so that the cam lobes 112 are in their uppermost position, the indexing plate 50 will assume its elevated position wherein the balls 64 clear the balls 42 and the indexing plate is free to be rotated manually in either direction. When the manipulating handle 106 is turned so that the cam lobes 112 are in their lowermost position, the indexing plate will assume its lowered position with the balls 64 resting tangentially upon the balls 42 in a selected position of indexing adjustment.

Means are provided for securely locking the indexing plate 50 in its lowered position and, accordingly, the cam lobe 114 is surrounded by a cage-like structure 150 of rectangular design and which is secured by a threaded stud 152 to the lower end of a vertical pull rod 154. The upper end of the pull rod 154 projects through the indexing plate 50 and terminates within a centrally disposed circular socket 156 in the upper side of the plate. The upper end of the pull rod 154 is provided with a head or lateral flange 158 which overlies an antifriction bearing 160 on the bottom wall of the socket 156. As shown in FIG. 3, when the manipulating handle 106 is so disposed that the cam lobe 114 is in its lowermost position, the same will make camming engagement with the upwardly facing inside surface 162 of the cage-like structure 150 and cause a downward thrust to be applied to the bearing 160 and, consequently, to the indexing plate 50 as a whole so that the bearing will be under compression while the pull rod will be under tension. The net result of such tensional and compressional forces is to apply a slight compression to the balls 64 and 42, thus locking the indexing plate against turning movement relative to the base plate 24.

A combined dust guard apron and scale ring 170 surrounds and is suitably secured to the peripheral region of the indexing plate 50. The apron depends below the level of the clamping ring 60 and partially overhangs the clamping ring 38. The lower edge of the apron is in close proximity to the outer cylindrical surface of the latter ring 38 and serves to exclude the entrance of dust, dirt and other foreign material from the interior of the fixture 10 where the operative working parts of the same are disposed. A suitable scale 172 which may be graduated in angular degrees or fractions thereof may be inscribed on the lower region of the apron 170 for cooperation with a suitable pointer 174 which may be inscribed on the clamping ring 38.

The mechanism further may have associated therewith certain detent instrumentalities for preventing lowering of the indexing plate 50 at such times as the balls of the two series are vertically aligned and, thus, in dead-center positions. These instrumentalities have little bearing on the present invention, and although they have been illustrated in the drawings and designated in their entirety by the reference numeral 180, they will not be described in detail. Reference may be had to the abovementioned copending application for a full understanding of the nature and construction of such detent instrumentalities.

Before entering into a description of the nature and function of the two reaction posts 43 and 65, which, as previously stated, constitute the principal feature of the present invention, it is deemed pertinent to explain the operation of the mechanism in order that coaction between the two series of balls 42 and 64 which is modified by such reaction posts will become understood. Accordingly, in the operation of the mechanism 10, assuming the parts to be in the locked position in which they are illustrated in FIG. 3, when it is desired to alter the setting of the indexing plate 50 relatively to the base plate 24, it is merely necessary for the operator to engage the manipulating handle 106 and turn the same in a direction to move the two cam lobes 112 to the uppermost position of which they are capable of assuming. This movement of the cam lobes exerts a camming action on the underneath annular face of the thrust ring 120 and causes the thrust ring to be elevated. Elevation of the thrust ring 120 exerts an upward thrust on the upper indexing plate 50 through the medium of the antifriction bearing assembly 128 so that the plate is elevated to the position wherein it is shown in FIGS. 2 and 3. In this elevated position of the indexing plate 50, the two series of balls 42 and 64 clear each other so that it is possible manually to turn the indexing plate into any desired angular position and in either direction.

As soon as the indexing plate 50 has been turned to the desired position of angular adjustment, the handle 106 may be manipulated to cause the cam lobes 112 to move downwardly and release the upper indexing plate which follows the movements of the cam lobes and descends upon the base plate 24. At such time as the two sets of balls 42 and 64 move into operative contact for accurate angular locating purposes, the medial cam lobe 114 exerts downward pressure on the surface 162 of the cage-like structure 150 and thus applies tension to the pull rod 154 to lock the plates 24 and 50 in place.

The actuating mechanism illustrated herein and described above is merely exemplary of one form of manual actuating mechanism which may be employed for effecting indexing operations. Other forms of actuating mechanism may be employed for effecting the necessary vertical movements of the indexing plate 50 relative to the base plate 24 including power-driven pneumatic or hydraulic means if desired.

It has been found that in connection with indexing mechanisms of the type herein described and employing two mating and complete series of circularly arranged balls, extreme difficulty has been encountered in preventing circumferential shifting of one or both series of balls bodily as a unit around the trough or channel in which the balls are seated or clamped. This is true in connection with indexing mechanisms employing the herein described clamping means, and despite the powerful clamping action exerted by the frusto-conical cam surfaces 70 of the clamping rings 38 and 60, it has been found that the cumulative camming thrust which is exerted by the contacting pairs of balls of the two series of balls is sufficiently great as to effect small increments of circumferential shifting of one or the other set of balls, or of both sets, each time the indexing plate 50 is caused to descend upon the base plate 24. The circumferential shifting of the balls collectively is cumulative insofar as successive indexing operations are concerned, and after a period of prolonged use of the fixture, the accumulated displacements are apparent and the indexing errors involved are such as to necessitate a time-consuming readjustment of the positions of the balls including a complete dismantling of the mechanism. Where power-actuated mechanism is employed for effecting indexing operations involving an increased impact between the balls incident to the use of increased force, a single indexing operation may be sufficient to cause circumferential offset of the balls.

Referring now particularly to FIGS. 3, 4 and 5, the two reaction posts 43 and 65 are identical in construction and function and, therefore, a description of one of them will suffice for the other. The reaction post 43 is in the form of a six-sided hardened steel block of rectangular design and one end thereof is press-fitted within a rectangular socket 200 formed in the annular land surface 32 of the base plate 24 and the other end of the post projects upwardly above this annular land surface a distance which is slightly in excess of the radius of the balls 42, but which is appreciably less than the diameter thereof. The rectangular upper face 202 of the post 43 thus lies well below the lowermost level of the upper series of balls 64 when the latter balls are seated upon the series of balls 42 as clearly shown in FIG.

3. The post 43, therefore, in no way interferes with the downward movement of the indexing plate 50 or prevents proper mating register of the two series of balls at the end of an indexing operation.

The width of the post 43 along the dimension indicated at "w" in FIGS. 3 and 4 is slightly less than the diameter of the balls 42 for in order to preserve the proper spacing between the two adjacent balls on opposite sides of the post. Since the post 43 replaces one of the balls of a complete endless circular row of balls, it is essential that the adjacent balls where the omission occurs remain separated by a distance precisely equal to the separation between alternate balls in the series. Because of the fact that the balls are disposed in a circular row and, therefore, are not in alignment row in the row, a line connecting the points of tangency between any three adjacent balls will be something less than a ball diameter. Specifically, the distance between such points of tangency will be equal to the length of a chord subtended by the arc of a circle whose radius is equal to the distance between the center of the plate 24 and the center of any given ball 42, the arc being of an extent equal to the circumferential distance on the circle between adjacent points of ball-tangency.

As best seen in FIG. 5, the width of the reaction post 43 in a direction radially of the base plate 24 is less than its width in a circumferential direction relative to the row of balls 42. This specific radial width is not critical and is selected so that there will be no interference by the post 43 with the clamping action of the clamping ring 38 and also to facilitate handling of the post during the installation procedure.

The two posts 43 and 65 serve effectively to prevent circumferential shifting of the row of balls with which they are respectively associated. Each post, in combination with the balls in its respective row, establishes an unbroken continuous solid column of steel or other metal of which the balls may be made. Since the reaction posts are incapable of circumferential shifting, and since otherwise the action of the two clamping rings 38 and 60 is such as to "align" the balls circumferentially, the presence of the reaction posts will positively prevent circumferential shafting of the two rows of balls bodily as a unit in either circumferential direction.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what I claim as new and desire to secure by Letters Patent is:

1. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post making tangential contact with each of said two balls and having a portion thereof fixedly anchored to the bottom wall of the respective channel within which the row of balls is disposed.

2. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post making tangential contact with each of said two balls and having a portion thereof fixedly anchored to the bottom wall of the respective channel within which the row of balls is disposed, said reaction post having its outer end terminating in a plane which is parallel to the channel bottom wall and which is closer thereto than the plane of mutual contact between the interfitting balls.

3. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post making tangential contact with each of said two balls and having a portion thereof fixedly anchored to the bottom wall of the respective channel within which the row of balls is disposed, said reaction post being wholly disposed within the channel and having its outer end terminating in a plane which is parallel to the channel bottom wall and which is closer thereto than the plane of mutual contact between the interfitting balls.

4. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post being provided with planar sides which extend in parallelism and make tangential contact respectively with said two balls.

5. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post being provided with planar sides which extend in parallelism and make tangential contact respectively with said two balls, the distance between said two sides of the reaction post being equal to the length of a chord subtended by an arc on a circle passing through the points of contact between adjacent balls in the arcuate row, and which arc is of an extent equal to the circumferential distance between adjacent points of contact.

6. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post being rectangular in cross section and presenting oppositely facing sides which are in tangential contact respectively with said two balls, the distance between said oppositely facing sides of the reaction post being equal to the length of a chord subtended by an arc on a circle passing through the points of contact between adjacent balls in the arcuate row, and which arc is of an extent equal to the circumferential distance between adjacent points of contact.

7. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post being rectangular in cross section and presenting oppositely facing sides which are in tangential contact respectively with said two balls, the distance between said oppositely facing sides of the reaction post being equal to the length of a chord subtended by an arc on a circle passing through the points of contact between adjacent balls in the arcuate row, and which arc is of an extent equal to the circumferential distance between adjacent points of contact, said reaction post having its outer end terminating in a plane which is parallel to the channel bottom wall and which is closer thereto than the plane of mutual contact between the interfitting balls.

8. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a reaction post interposed between the two balls of each row which are disposed at the opposite ends of the arcuate row, said reaction post being rectangular in cross section and presenting oppositely facing sides which are in tangential contact respectively with said two balls, the distance between said oppositely facing sides of the reaction post being equal to the length of a chord subtended by an arc on a circle passing through the points of contact between adjacent balls in the arcuate row, and which arc is of an extent equal to the circumferential distance between adjacent points of contact, said reaction post being wholly disposed within the channel and having its outer end terminating in a plane which is parallel to the channel bottom wall and which is closer thereto than the plane of mutual contact between the interfitting balls.

References Cited in the file of this patent

UNITED STATES PATENTS

| | | |
|---|---|---|
| 2,233,950 | Lepetit | Mar. 4, 1941 |
| 2,305,728 | Millholland | Dec. 22, 1942 |
| 2,369,209 | Bullard | Feb. 13, 1945 |
| 2,869,377 | Pieterse | Jan. 20, 1959 |
| 2,921,487 | Schabot | Jan. 19, 1960 |
| 2,926,537 | Pieterse | Mar. 1, 1960 |